(12) United States Patent
Baik et al.

(10) Patent No.: US 7,627,098 B2
(45) Date of Patent: Dec. 1, 2009

(54) INTELLIGENT MANAGEMENT APPARATUS AND METHOD OF DIGITAL HOME NETWORK SYSTEM

(75) Inventors: Seoung Ho Baik, Daejeon (KR); Shin Young Lim, Daejeon (KR); Jae Doo Huh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 869 days.

(21) Appl. No.: 11/292,704

(22) Filed: Dec. 1, 2005

(65) Prior Publication Data
US 2006/0140205 A1 Jun. 29, 2006

(30) Foreign Application Priority Data
Dec. 7, 2004 (KR) ...................... 10-2004-0102462

(51) Int. Cl.
*H04M 11/00* (2006.01)
(52) U.S. Cl. .............................. 379/102.05; 379/102.03; 379/102.04
(58) Field of Classification Search ............ 379/102.05, 379/102.01, 102.02, 102.03, 102.04, 102.06
See application file for complete search history.

(56) References Cited

U.S. PATENT DOCUMENTS

| 6,747,675 B1 | 6/2004 | Abbott et al. |
| 6,756,998 B1* | 6/2004 | Bilger ........................ 715/764 |
| 2004/0054726 A1 | 3/2004 | Doss et al. |

FOREIGN PATENT DOCUMENTS

| JP | 2000-275318 | 10/2000 |
| KR | 1020030060519 | 7/2003 |
| KR | 2003-0065058 | 8/2003 |
| KR | 1020040032315 | 4/2004 |

OTHER PUBLICATIONS

S. Baek, et al.;"Managing Mechanism for Service Compatibility and Interaction Issues in Context-aware Ubiquitous Home"; Feb. 15, 2005 IEEE, 5 pages.
M. Kolberg, et al. "Compatibility Issues between Services supporting Networked Appliances", Dept. of Computing Science and Mathematics, University of Stirling; Nov. 2003; 17 pages.

* cited by examiner

*Primary Examiner*—Stella L Woo
(74) *Attorney, Agent, or Firm*—Blakely, Sokoloff, Taylor & Zafman LLP (57) ABSTRACT

Provided is an intelligent management apparatus and method of a digital home network system. The intelligent management apparatus includes: a context aware portion for extracting context aware information from sensing data, generating context information, history information and object information based on the context aware information, and generating context priority information based on the context information when at least two contexts conflict with each other; an information directory for storing the context information, the history information, the object information, the context priority information; a service determining portion for detecting events based on the context aware information, reasoning services corresponding to the events based on the information stored in the information directory, and outputting reasoned service information; and a service control portion for determining a service priority of services to be executed based on the reasoned service information and controlling drive of devices corresponding to the respective services according to the determined service priority. The intelligent management apparatus and method of the digital home network system prevent a collision between the context information and services which may happen during operation of the digital home network system and minimize user's intervention.

26 Claims, 6 Drawing Sheets

| CONTEXT INFORMATION \ PRIORITY ITEM | USER PRIORITY | INTEREST PRIORITY | DEMAND PRIORITY | PRIORITY VALUE |
|---|---|---|---|---|
| SIF1 | P1 | P3 | P1 | PV1(=2P1+P3) |
| SIF2 | P2 | P1 | P3 | PV2(=P1+P2+P3) |
| SIF3 | P3 | P2 | P2 | PV3(=2P2+P3) |

FIG. 4B

| CONTEXT INFORMATION \ PRIORITY ITEM | USER PRIORITY | INTEREST PRIORITY | DEMAND PRIORITY | PRIORITY VALUE |
|---|---|---|---|---|
| SIF1 | P1 | P2 | P3 | PV1(=P1+P2+P3) |
| SIF2 | P2 | P3 | P1 | PV2(=P1+P2+P3) |

FIG. 5

| SERVICE \ PRIORITY ITEM | IMPORTANCE PRIORITY | AVAILABLE DEVICE PRIORITY | PRIORITY VALUE |
|---|---|---|---|
| V1 | R1 | R1 | SV1(=2R1) |
| V2 | R2 | R2 | SV2(=2R2) |
| V3 | R3 | R3 | SV3(=2R3) |

INTELLIGENT MANAGEMENT APPARATUS AND METHOD OF DIGITAL HOME NETWORK SYSTEM

CROSS-REFERENCE TO RELATED APPLICATION

This application claims priority to and the benefit of Korean Patent Application No. 2004-102462, filed Dec. 7, 2004, the disclosure of which is incorporated herein by reference in its entirety.

BACKGROUND

1. Field of the Invention

The present invention relates to a digital home network system, and more particularly, to an intelligent management apparatus and method of a digital home network system.

2. Discussion of Related Art

As information technologies are developed, technologies which provide various services to a user in home environment like a digital home network system have been developed. The existing digital home network system employs a one-to-one service which provides one service to one user at once. However, such a one-to-one service is difficult to satisfy various demands of all users in home environment where a plurality of users having different inclinations exist and various devices manufactured by different manufacturers exist compositively. Thus, in order to simultaneously provide services suitable for each user's special character, more efficient management of the digital home network system is required.

Figure 1:
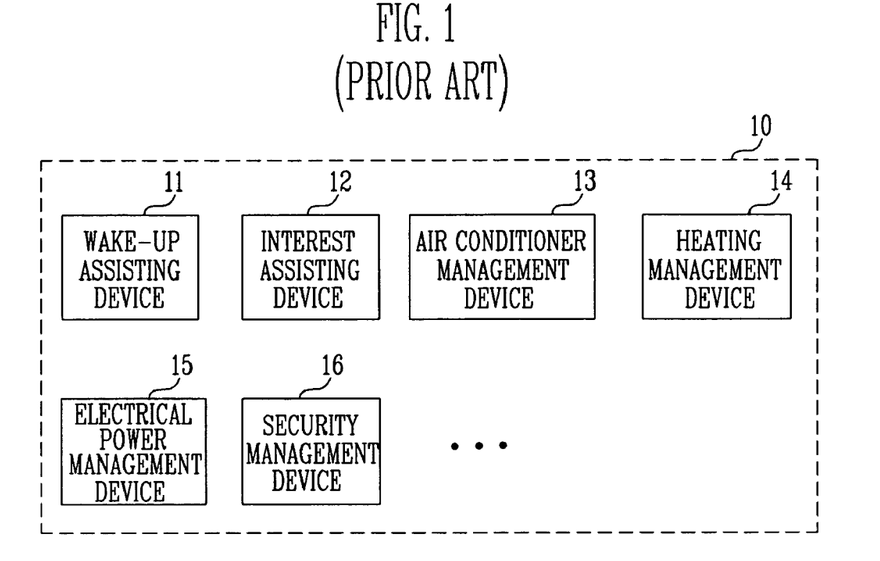
FIG. 1 is a block diagram illustrating a management apparatus of a conventional digital home network system.

FIG. 1 is a block diagram illustrating a management apparatus 10 of a conventional digital home network system. The management apparatus 10 includes a wake-up assisting device 11, an interest assisting device 12, an air conditioner management device 13, a heating management device 14, an electrical power management device 15, and a security management device 16, and it can includes additional management or assisting devices. The management apparatus 10 controls the digital home network system to perform various services. Here, the management apparatus 10 should control the digital home network system to provide services suitable for various users. However, since the users have different personal inclinations, collision and interference may occur between services when the services are provided to the users. For example, there exists a case where "wake-up assisting service" is provided to users A and B having different schedules. If a wake-up time of the user A is 7:00 am and a wake-up time of the user B is 8:00 am, the wake-up assisting device 11 controls its operation (alarm) according to a wake-up time of the user A whose wake-up time is earlier than the user B's. As a result, the user B gets interfered because he should wake up according to the user A's schedule. Also, there exists a case where "multimedia service on demand" is provided to different users C and D. For example, if the user C is interested in a movie program and the user D is interested in a sports program, the interest assisting device 12 does not decide which user's interest between the users C and D it should satisfy to provide the service. Thus, context collision between the services occurs.

A cause of collision between the services is not limited to users' different inclinations but can include all various contexts which may occur in home environment. The collision between the services according to different contexts is caused by independent operation of the devices in the management apparatus 10. For example, when "home security service" is executed, the security assisting device 16 turns on all lights in the house as if some one is in the house to thereby prevent any possible invader. Also, when "home management service" is executed, the electrical power management device 15 disconnects all unnecessary power when there is no person in the house to reduce power consumption. Thus, there occurs a collision between the home security service and the home management service. Similarly, when "home automatic heating service" is executed, the heating management device 14 detects a drop of the room temperature to thereby control the drive of the heating system. Also, when "home automatic air-conditioning service" is executed, the air-conditioner management device 13 detects an increase of the room temperature to thereby control the drive of the air conditioner. As a result, the home automatic heating service and the home automatic air-conditioning service conflict with each other, and there may occur a case where the two services should be provided infinitely. A problem resulting from the collision between the services is classified into an interaction problem which happens for one service and an interaction problem which happens between different services. Also, the collision between the services may cause the user's intervention. That is, whenever a service collision happens, the user should select one service between the services having collision.

As described above, the management apparatus 10 of the conventional digital home network system cannot appropriately cope with the collision between the services which often happens. Thus, the management apparatus 10 has a problem in that the user should intervene whenever a collision between the services occurs.

SUMMARY OF THE INVENTION

The present invention is directed to an intelligent management apparatus of a digital home network system which automatically senses various contexts which happen inside and outside a digital home, determines a priority of services to be executed corresponding to the happened contexts, and controls the digital home network system to provide a corresponding service according to the determined priority, thereby preventing a collision between the services and minimizing user's intervention.

The present invention is also directed to an intelligent management method of a digital home network system which automatically senses various contexts which happen inside and outside a digital home, determines a priority of services to be executed corresponding to the happened contexts, and controls the digital home network system to provide a corresponding service according to the determined priority, thereby preventing a collision between the services and minimizing user's intervention.

One aspect of the present invention is to provide an intelligent management apparatus of a digital home network system including: a context aware portion for extracting context aware information from sensing data, generating context information, history information and object information based on the context aware information, and generating context priority information based on the context information when at least two contexts conflict with each other; an information directory for storing the context information, the history information, the object information, the context priority information; a service determining portion for detecting events based on the context aware information, reasoning services corresponding to the events based on the information stored in the information directory, and outputting the reasoned service information; and a service control portion for determining a service priority of services to be executed based on the reasoned service information and controlling drive of corresponding devices to the respective services according to the determined service priority.

Another aspect of the present invention is to provide an intelligent management method of a digital home network system, including: extracting context aware information from the sensing data for inside and outside environment of a digital home; generating context information, history information, and object information based on the context aware information; aware contexts happened in the digital home based on the context aware information and generating context priority information which represents a priority of at least two contexts when the at least two contexts conflict; detecting events based on the context aware information and reasoning services corresponding to the happened events based on the context information, the history information, the object information, the context priority information, user priority information, and service information; determining service devices to be driven based on the reasoned services and determining a service priority of at least two services when the two services conflict with each other; and controlling drive of the service according to the determined service priority.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF PREFERRED EMBODIMENTS

The present invention will now be described more fully with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 2:
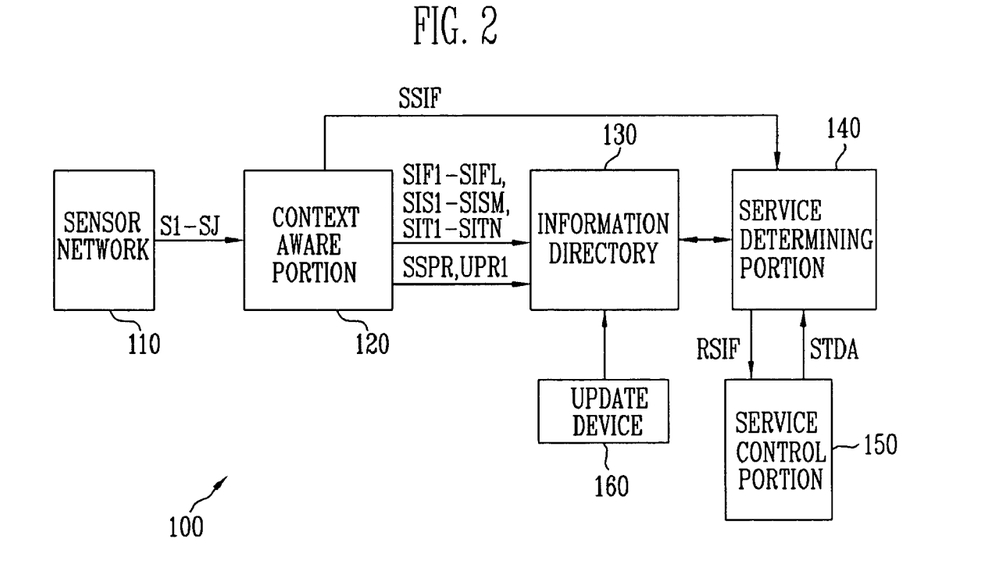
FIG. 2 is a block diagram illustrating an intelligent management apparatus of a digital home network system according to an exemplary embodiment of the present invention.

FIG. 2 is a block diagram illustrating an intelligent management apparatus 100 of a digital home network system according to an exemplary embodiment of the present invention. The intelligent management apparatus 100 includes a sensor network 110, a context aware portion 120, an information directory 130, a service determining portion 140, and a service control portion 150. The sensor network 110 senses inside and outside environment of the digital home to generate sensing data S1 TO SJ (J is an integer). The context aware portion 120 extracts context aware information SSIF from the sensing data S1 TO SJ and generates context information SIF1 to SIFL (L is an integer), history information SIS1 TO SISM (M is an integer), and object information SIT1 TO SITN (N is an integer) based on the context aware information SSIF. The context aware portion 120 outputs the context aware information SSIF to the service determining portion 140 and outputs the context information SIF1 TO SIFL, the history information SIS1 TO SISM and the object information SIT1 TO SITN to the information directory 130. The context aware portion 120 determines whether at least two contexts conflict or not based on the context aware information SSIF and generates context priority information SSPR based on the context information SIF1 TO SIFL when the at least two contexts conflict. The context aware portion 120 generates user priority information UPR1 based on the context priority information SSPR.

The information directory 130 stores the context information SIF1 to SIFL, the history information SIS1 TO SISM, the object information SIT1 TO SITN, the context priority information SSPR, and the user priority information UPR1. The history information SIS1 TO SISM contains the users' profile information like individual's inclination, taste, and interest. The information directory 130 stores service information UIV and user priority information UPR2 which are received from an external portion. The service information UIV represents specification of the services which exist in the digital home. Here, the user priority information UPR1 represents a user priority which is updated according to context priority determined by the context aware portion 120, and the user priority information UPR2 represents a user priority which is previously set by the registration of the users.

The intelligent management apparatus 100 may further include an update device 160. The update device 160 updates the context information SIF1 to SIFL, the history information SIS1 TO SISM, and the object information SIT1 TO SITN stored in the information directory 130 to updated information. Meanwhile, the update device 160 may store the context information, the history information, the object information, and service information which are previously set in the directory information 130 at the beginning stage of operation of the intelligent management apparatus 100, and then the update device 160 may update the stored information to the updated information during operation of the intelligent management apparatus 100.

The service determining portion 140 accesses to the information directory 130 to read the context information SIF1 to SIFL, the history information SIS1 TO SISM, the object information SIT1 TO SITN, the context priority information SSPR, the service information UIV, and the user priority information UPR when events are sensed from the context aware information SSIF. The service determining portion 140 reasons the services corresponding to the events based on the read information and outputs the reasoned service information RSIF which represents specification of the reasoned services. The service control portion 150 determines service priority for the services to be executed based on the reasoned service information RSIF and controls drive of the corresponding devices according to the service priority. The service control portion 150 generates study data STDA based on the service priority and outputs the study data STDA to the service determining portion 140. The service determining portion 140 is studied by the study data STDA, and the service determining portion 140 updates the information stored in the information directory 130 based on the study information STDA. The service determining portion 140 may access the information directory 130 to be studied by the received context priority information SSPR.

Figure 3:
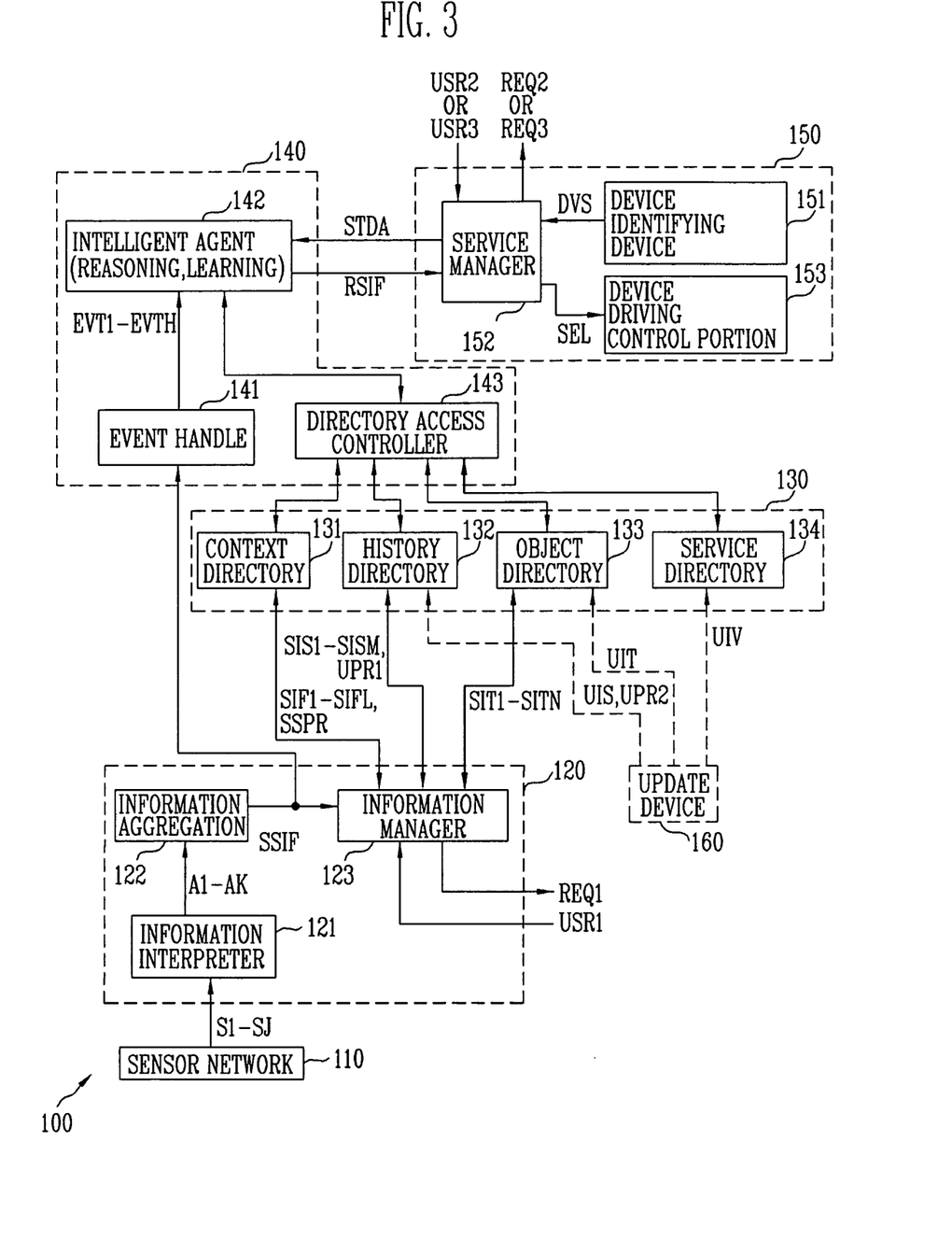
FIG. 3 is a detailed block diagram illustrating the intelligent management apparatus of FIG. 2.

Configuration and detailed operation of the intelligent management apparatus 100 are explained below. FIG. 3 is a detailed block diagram illustrating the intelligent management apparatus 100 of FIG. 2. Referring to FIG. 3, the intelligent management apparatus 100 includes the sensor network 110, the context aware portion 120, the information directory 130, the service determining portion 140, and the service control portion 150. The sensor network 110 senses inside and output environment of the digital home to generate sensing data S1 TO SJ. The sensing data S1 TO SJ contains original information that, for example, environment, user's inclination, time, and user's location are expressed in machine language.

The context aware portion 120 includes an information interpreter 121, an information integrator 122, and an information manager 123. The information interpreter 121 interprets the sensing data S1 TO SJ and outputs interpreted information A1 to AK (K is an integer). For example, the interpreted information A1 to AK contains location information of the users and the objects, information which represents status of the objects, and information which represents various contexts which currently happen (e.g., a fire or user's request for a certain service). The information integrator 122 integrates the interpreted information A1-AK and extracts the context aware information SSIF based on the integration result. For example, there may exist a case where the interpreted information A1 represents that a user X1 is in the kitchen and the interpreted information A2 represents that a fire breaks out in the kitchen. In this case, the information integrator 122 integrates the interpreted information A1 and A2 to generate the context aware information SSIF which represents that the user X1 is in the kitchen and a fire breaks out in the kitchen (context ☐). As another example, there may exist a case where the interpreted information A3 represents that a user X2 requests for movie program watching and the interpreted information A4 represents that the user X2 requests to make room lighting dark when the user X2 watches the movie program. In this case, the information integrator 122 integrates the interpreted information A3 and A4 to generate the context aware information SSIF which represents that the user X2 requests for the movie program and requests to make the room lighting dark (context ☐). As a further example, there may exist a case where the interpreted information A5 represents the a user X3 requests to patch an OS program of a mobile device D with the latest version and the interpreted information A6 represents that a manufacturer of the mobile device D is a company F. In this case, the information integrator 122 integrates the interpreted information A5 and A6 to generate the context aware information SSIF which represents that the OS program of the mobile device D should be patched with the latest version and the manufacturer of the mobile device D is a company F (context ☐). Accordingly, the context aware information SSIF contains information for the contexts ☐ to ☐ and additionally contains information for added context when the additional contexts happen.

The information manager 123 generates the context information SIF1 TO SIFL, the history information SIS1 TO SISM, and the object information SIT1 TO SITN based on the context aware information SSIF. The context information SIF1 TO SIFL contains location information of users who exist inside and outside the digital home, location information of the objects, and information for various contexts happened. Referring to the contexts ①  to ③, the context information contains location information of the user X1, fire information, movie program watching request information, room lighting control request information, and mobile device OS program patch request information. The history information SIS1 TO SISM contains profile information of the users like individual's inclination, taste and interest. Referring to the contexts ①  to ③, the history information contains the user X2's interest information (i.e., movie) and the room lighting information that the user X2 desires while watching a movie. The object information SIT1 TO SITN contains detailed profile information of the objects like manufacturers of all objects which are fixed to a certain place or are movable inside and outside the digital home. Referring to the contexts ①  to ③, the object information contains the manufacturer information of the mobile device D and the OS program information of the mobile device D.

Figure 4A:
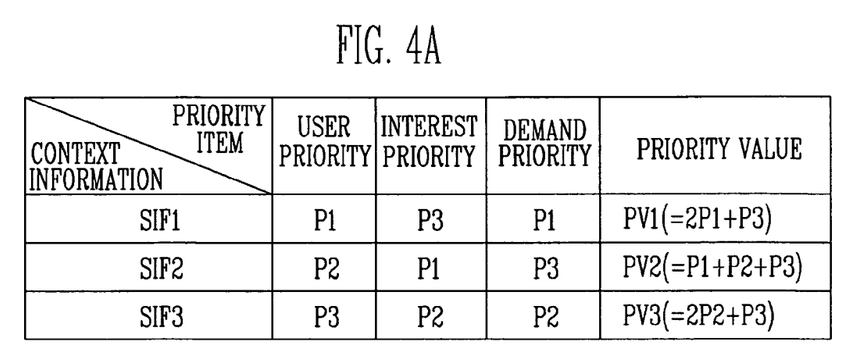
FIGS. 4A and 4B are tables related to calculation of context priority values by an information manager shown in FIG. 2.

The information manager 123 determines whether at least two contexts conflict or not based on the context aware information SSIF. When the at least two contexts conflict, the information manager 123 determines priority of the interacted contexts and generates the context priority information SSPR according to the determination result. In more detail, the information manager 123 calculates priority values of the context information SIF1 TO SIFL to determine the priority of the interacted contexts. The information manager 123 compares the calculated priority values and generates the context priority information SSPR according to the comparison result. For example, there may exist a case where the context information SIF1 represents that a user U1 requests for education program watching, the context information SIF2 represents that a user U2 requests for sports program watching, and the context information SIF3 represents that a user U3 requests for movie program watching. For this case, a table related to operation of the information manager 123 for calculating the priority values of the context information SIF1-SIF3 is shown in FIG. 4A. Referring to FIG. 4A, P1 represents a first priority, P2 represents a second priority, and P3 represents a third priority.

The information manager 123 determines priorities that the context information SIF1-SIF3 occupy according to the priority items respectively. The priority item may contain, for example, user priority, interest priority, and demand priority. Here, the information manager 123 determines the priorities that the context information SIF1-SIF3 occupy according to the priority items, respectively, based on reference priority information which is previously set in the information manager 123. Alternately, the information manager 123 may determine the priorities that the context information SIF1-SIF3 occupy according to the priority items respectively based on the information stored in the information directory 130. The kinds of the priority items may be increased or decreased if needed.

In FIG. 4A, a priority value PV1 of the context information SIF1 is "2P1+P3", a priority value PV2 of the context information SIF2 is "P1+P2+P3", and a priority value PV3 of the context information SIF3 is "2P2+P3". When magnitudes of the priority values PV1 to PV3 are compared, magnitude relation of the priority values PV1 to PV3 is PV1>PV3>PV2. Thus, the context priority information SSPR generated from the information manager 123 represents that the priority for the interacted contexts is in order of SIF1, SIF3, and SIF2. As described above, the priority value of the context information may be calculated by adding up the priority values that the context information occupies in each priority item.

Figure 4B:
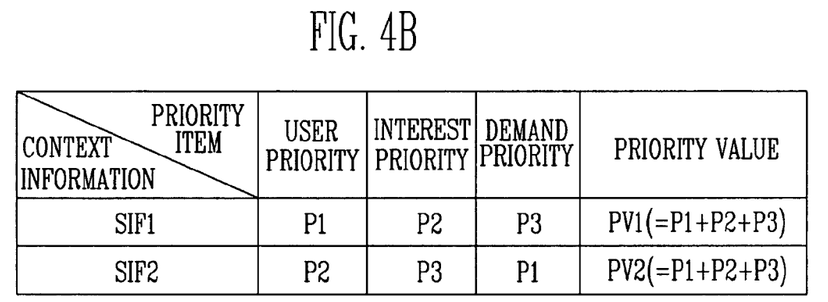

Meanwhile, as shown in FIG. 4B, there may exist a case where the priority value PV1 of the context information SIF1 and the priority value PV2 of the context information SIF2 are identical as "P1+P2+P3". In this case, the information manager 123 transmits user intervention request signal REQ1 to an external portion and then generates the context priority information SSPR based on user selection information USR1 externally received and the priority values PV1 to PV3.

The information directory 130 is controlled by access of the information manager 123. The information directory 130 includes a context directory 131, a history directory 132, an object directory 133, and a service directory 134. The context directory 131 stores the context information SIF1 TO SIFL and the context priority information SSPR. The history directory 132 stores the history information SIS1 TO SISM and the user priority information UPR1. The object directory 133 stores the object information SIT1-SITL. The service directory 134 stores service information UIV which represent specification of the services which exist in the digital home and execution result information (not shown) on service after service execution. The intelligent management apparatus 100 may further include the update device 160. The update device 160 updates the user priority information of the history information stored in the history directory 132 to the user priority information UPR2 of the updated history information UIS.

The update device 160 updates the object information stored in the object directory 133 to the updated object information UIT and updates the service information stored in the service directory 134 to the updated service information. Meanwhile, the update device 160 may store the history information and the priority information which are previously set in the history directory 132, store the object information which are previously set in the object directory 133, and store the service information which are previously set in the service directory 134.

The service determining portion 140 includes an event handle 141, an intelligent agent 142, and a directory access controller 143. The event handle 141 detects events which are generated from the context aware information SSIF to output event signals EVT1-EVTH (H is an integer). The intelligent agent 142 receives the event signals EVT1-EVTH to reason services corresponding to the generated events based on the context information SIF1 TO SIFL, the context priority information SSPR, the history information SIS1 TO SISM, the user priority information UPR1 or UPR2, the object information SIT1 TO SITN, and the service information UIV. Then, the intelligent agent 142 outputs the reasoned service information RSIF which represents the specification of the reasoned services. The intelligent agent 142 receives the study information STDA from the service control portion 150 and so is studied by the study information STDA. The intelligent agent 142 outputs the context information (not shown), the history information (not shown), the object information (not shown), and the service information (not shown) which are updated by the study information STDA to the directory access controller 143. The intelligent agent 142 may be studied by the received context priority information SSPR by accessing the information directory 130 through the directory access controller 143. The directory access controller 143 accesses the information directory 130 by the request of the intelligent agent 142.

The service control portion 150 includes a device identifying portion 151, a service manager 152, and a device driving control portion 153. The device identifying portion 151 outputs to the service manager 152 device identification information DVS which represents specification of devices which are currently available among the devices performing a service and existing inside and outside the digital home. The service manager 152 determines devices to be driven based on the reasoned service information RSIF and the device identification information DVS. When the device to be driven does not exist in the digital home, the service manager 152 outputs a user intervention request signal REQ2 to an external portion and receives user selection information USR2 from an external portion.

Then, the service manager 152 determines whether at least two services conflict each other or not based on the reasoned service information RSIF, the device identification information DVS or the user selection information USR2. If the at least two services do not conflict each other, the service manager 152 generates a device selecting signal SEL based on the reasoned service information RSIF and the device identification information DVS. If the at least two services conflict each other, the service manager 152 determines the service priority for the interacted services and then generates the device selecting signal SEL according to the determined service priority.

In more detail, the service manager 152 calculates priority values for the interacted services in order to determine the service priority for the interacted services. The service manager 152 compares the calculated priority values and determines the service priority according to the comparison result. For example, a security management service V1, a power management service V2 and an environment management service V3 may conflict one another. That is, when the security management service V1 is executed, all room lightings are turned on, and windows and doors are closed. When the power management service V2 is executed, all unnecessary room lightings are turned off to reduce power consumption. When the environment management service V3 is executed, all windows and doors are opened to ventilate a room. Thus, the services V1 to V3 may conflict one another.

Figure 5:
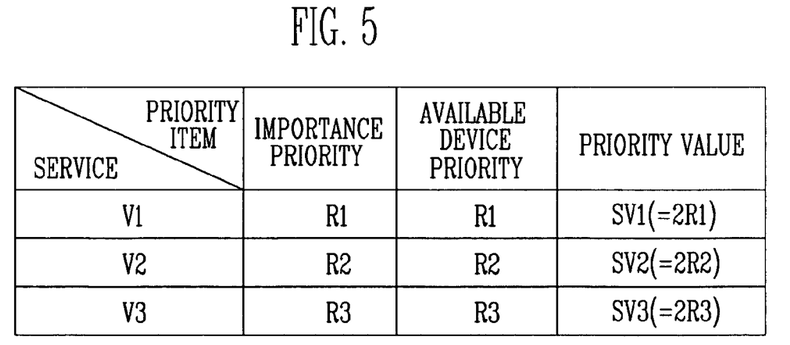
FIG. 5 is a table related to calculation of service priority values by a service manager shown in FIG. 2.

Here, a table related to a process for calculating the priority values of the services V1 to V3 is shown in FIG. 5. Referring to FIG. 5, R1, R2 and R3 represent a first priority, a second priority and a third priority, respectively. The service manager 152 determines priorities that the services V1 to V3 occupy according to the priority items respectively. The priority item may contain, for example, an importance (or urgency) priority and an available device priority. Here, the service manager 152 determines priorities that the services V1 to V3 occupy according to the priority items respectively based on reference priority information which is previously set in the service manager 152. The kinds of the priority items may be increased or decreased if needed.

In FIG. 5, a priority value SV1 of the service V1 is "2R1", a priority value of the service V2 is "2R2", and a priority value SV3 of the service V3 is "2R3". When magnitudes of the priority values SV1 to SV3 are compared, magnitude relation of the priority values SV1 to SV3 is "SV1>SV2>SV3. Thus, the service priority is in order of V1, V2 and V3. As described above, the priority value of the service may be calculated by adding up the priority values that the service occupies in each priority item.

Meanwhile, there may exist a case where the priority value SV1 of the service V1 and the priority value SV2 of the service V2 are identical as "R2+R3". In this case, the service manager 123 transmits user intervention request signal REQ3 to an external portion and then determines the service priority based on user selection information USR3 externally received and the priority values SV1 to SV3. Thus, the service manager 152 outputs the device selecting signal SEL according to the determined service priority. The device driving control portion 153 controls drive of the corresponding device in response to the device selecting signal SEL.

Then, operation of the digital home network system executed by the intelligent management apparatus 100 will be explained below with reference to FIGS. 6 and 7.

Figure 6:
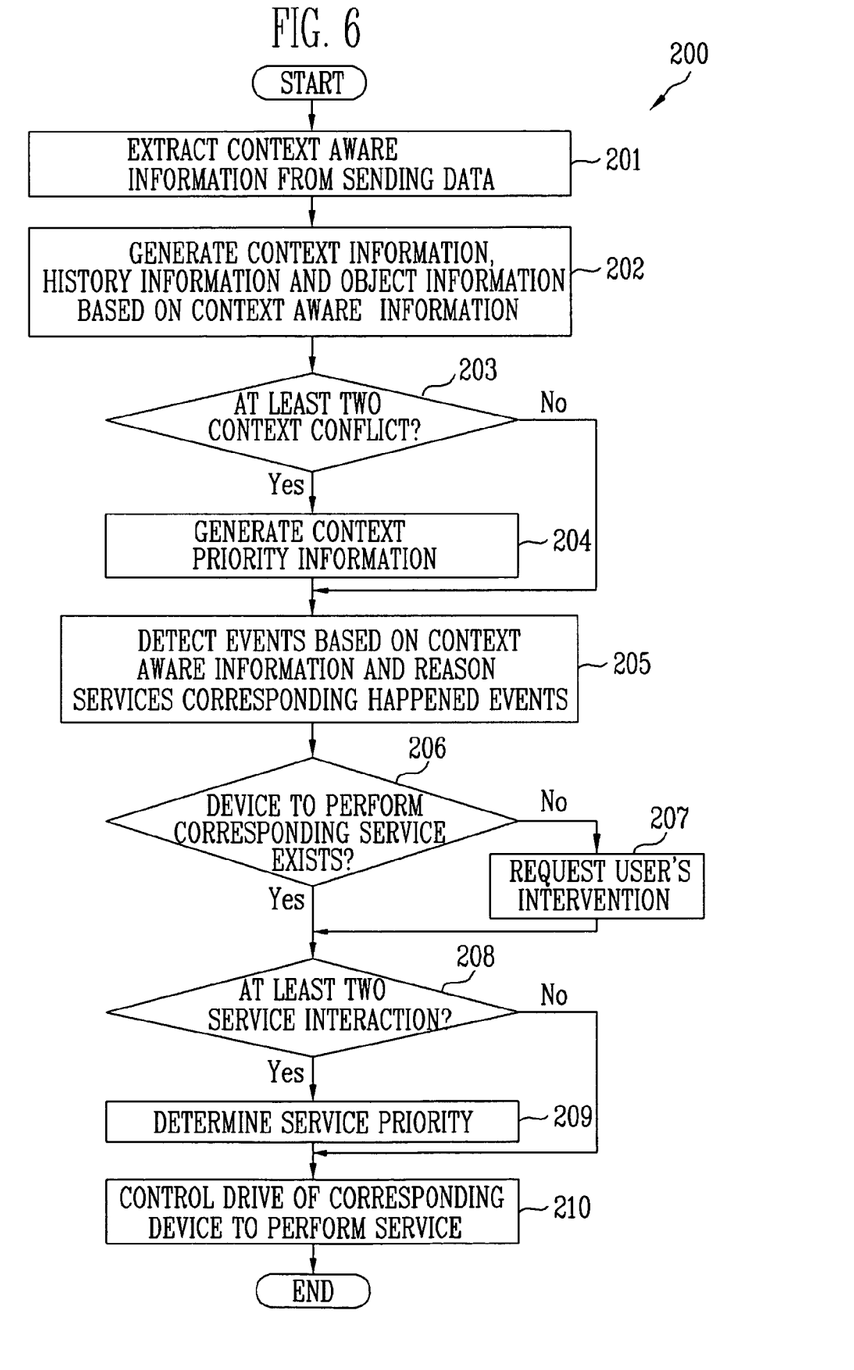
FIG. 6 is a flow chart illustrating an intelligent management process of the digital home network system according to an exemplary embodiment of the present invention.

FIG. 6 is a flow chart illustrating an intelligent management process of the digital home network system according to an exemplary embodiment of the present invention. First, the sensor network 110 senses inside and outside environment of the digital home to output the sensing data S1 to SJ. The context aware portion 120 extracts the context aware information SSIF from the sensing data S1 to SJ (step 201). The context aware portion 120 generates the context information SIF1 to SIFL, the history information SIS1 to SISM, and the object information SIT1 to SITN based on the context aware information SSIF (step 202).

Then, the context aware portion 120 recognizes contexts which happen in the digital home based on the context aware information SSIF and determines whether at least two contexts conflict each other or not (step 203). If the at least two contexts conflict each other, the context aware portion 120 generates the context priority information SSPR which represents a priority of the at least two contexts (step 204). The step 204 will be explained later in detail with reference to FIG. 7.

The service determining portion 140 detects events which happen inside and outside the digital home based on the context aware information SSIF and reasons the services corresponding to the events (step 205). As a result, the service determining portion 140 outputs the reasoned service information RSIF which represents specification of the reasoned services. The service control portion 150 determines whether there is a device which can perform the corresponding service in the digital home based on the reasoned service information RSIF (step 206). The service control portion 150 generates the user intervention request signal REQ2 to request the user's intervention when the device which can perform the corresponding service does not exist (step 207). As a result, the service control portion 150 receives the user selection information USR2 which represents specification of the substitution devices of the devices to be driven.

Then, the service control portion 150 determines whether the at least two services among the reasoned services conflict each other (step 208). If the at least two services interaction each other, the service control portion 150 determines the service priority for the at least two services (step 209). The step 209 will be explained later in detail with reference to FIG. 8. The service control portion 150 controls drive of the corresponding device to perform the service according to the determined service priority (step 210).

Even though not shown in FIG. 6, the service control portion 150 may generate the study information STDA based on the determined service priority. The service determining portion 140 is studied by the study information STDA. The service determining portion 140 may be studied by the context priority information SSPR. Thus, when the same context or service collision as previously occurred one occurs, the service determining portion 140 operates as studied.

Figure 7:
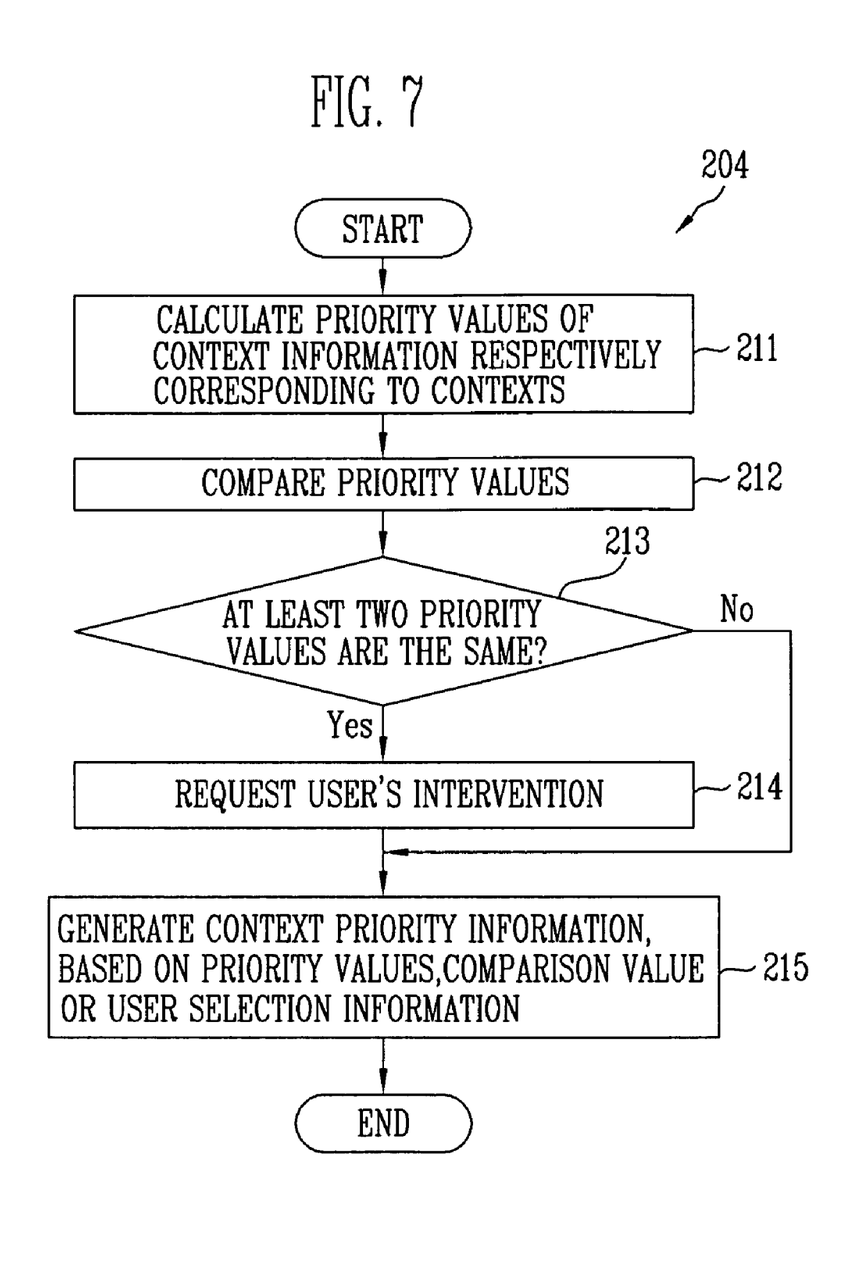
FIG. 7 is a detailed flow chart illustrating a process for generating the context priority information shown in FIG. 4.

FIG. 7 is a detailed flow chart illustrating a process for generating the context priority information shown in FIG. 4. Referring to FIG. 7, the context aware portion 120 calculates the priority values of the context information respectively corresponding to the interacted contexts (step 211). Here, a process for calculating the priority values of the context information is the same as the operation of the information manager 123 of FIG. 3 and thus description on that is omitted. Then, the context aware portion 120 compares the priority values (step 212). The context aware portion 120 determines whether at least two priority values are the same (step 213). If the at least two priority values are the same, the context aware portion 120 generates the user intervention request signal REQ1 to request the user's intervention (step 214). As a result, the context aware portion 120 receives the user selection information USR1 which represents the priority of the context information respectively corresponding to the at least two priority values. Then, the context aware portion 120 generates the context priority information SSPR based on the priority values, the comparison result of the step 212 or the user selection information USR1 (step 215).

Figure 8:
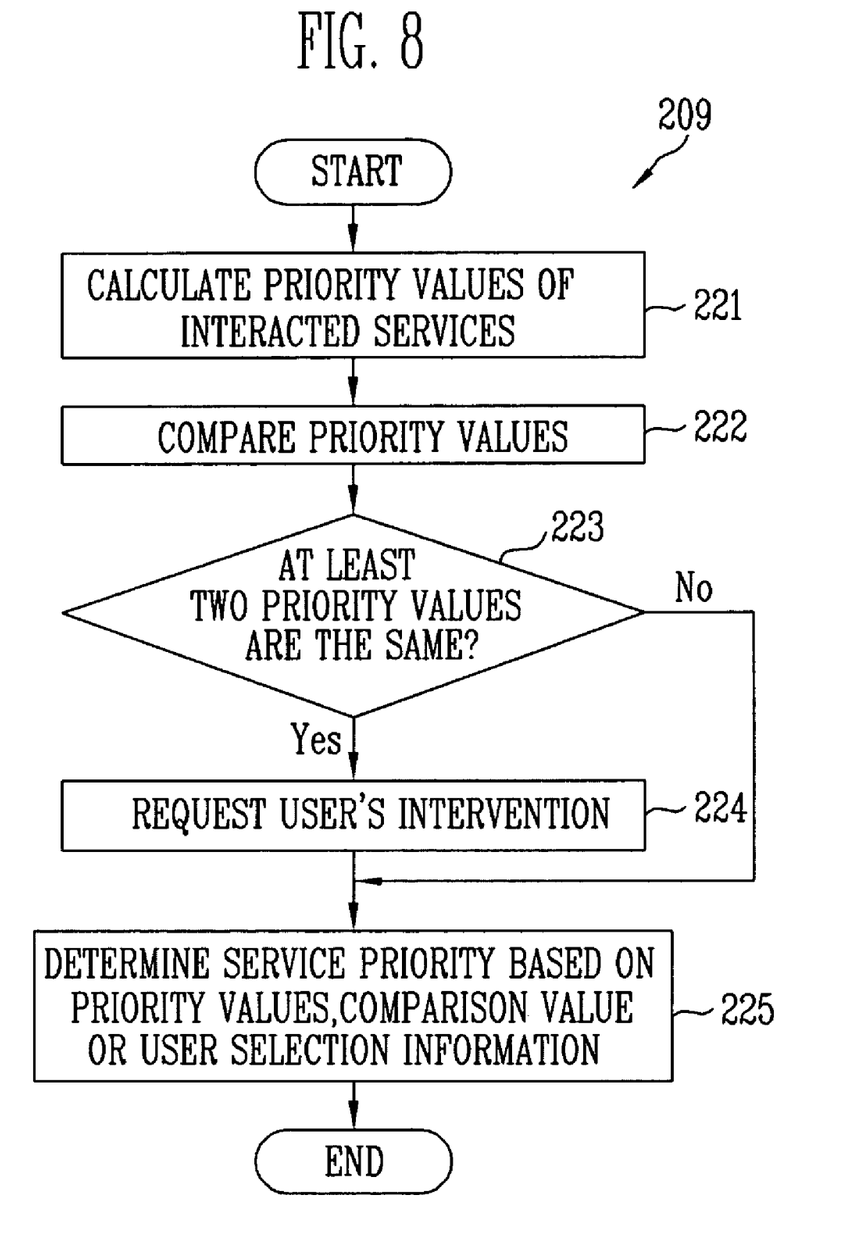
FIG. 8 is a detailed flow chart illustrating a process for determining the service priority shown in FIG. 4.

FIG. 8 is a detailed flow chart illustrating a process for determining the service priority of FIG. 4. Referring to FIG. 8, the service control portion 150 calculates the priority values of the interacted services (step 221). Here, a process for calculating the priority values of the interacted services is the same as the operation of the service manager 152 of FIG. 3 and thus description on that is omitted.

Then, the service control portion 150 compares the priority values (step 222). The service control portion 150 determines whether at least two priority values are the same (step 223). If the at least two priority values are the same, the service control portion 150 generates the user intervention request signal REQ3 to request the user's intervention (step 224). As a result, the service control portion 150 receives the user selection information USR3 which represents the priority of the services respectively corresponding to the at least two priority values. Then, the service control portion 150 determines the service priority for the services to be executed based on the priority values, the comparison result of the step 222 or the user selection information USR3 (step 225).

As described herein before, the intelligent management apparatus and method of the digital home network system according to the present invention determine the priority of various contexts which happen inside and outside a digital home and the priority of services to be executed corresponding to the happened contexts and control the digital home network system to provide a corresponding service according to the determined priority, thereby preventing a collision between the context information and the services and minimizing user's intervention.

Exemplary embodiments of the present invention have been described in detail; however the present invention is not limited thereto. Those skilled in the art will appreciate that a variety of modifications can be made to the described embodiments without departing from the spirit and scope of the present invention as defined by the appended claims and their equivalents.

What is claimed is:

1. An intelligent management apparatus of a digital home network system, comprising:
   a context aware portion for extracting context aware information from sensing data, generating context information, history information and object information based on the context aware information, and generating context priority information based on the context information when at least two contexts conflict with each other;
   an information directory for storing the context information, the history information, the object information, the context priority information;
   a service determining portion for detecting events based on the context aware information, reasoning services corresponding to the events based on the information stored in the information directory, and outputting reasoned service information; and
   a service control portion for determining a service priority of services to be executed based on the reasoned service information and controlling drive of devices corresponding to the respective services according to the determined service priority, wherein when at least two service priorities of services are the same, the context aware portion generates a user intervention request signal to adjust the at least two service priorities.

2. The intelligent management apparatus of claim 1, further comprising, a sensor network for sensing inside and outside environment of a digital home and generating the sensing data.

3. The intelligent management apparatus of claim 1, wherein the information directory further stores service information which represents specification of services which exist in the digital home and a user priority information which represents a priority of users of the digital home, and the intelligent management apparatus further includes an update device which stores the history information, the object information, the service information, and the user priority information in the information directory at an initial stage and updates the information stored in the information directory to updated information.

4. The intelligent management apparatus of claim 3, wherein the information directory includes:
   a context directory for storing the context information and the context priority information;
   a history directory for storing the history information and the user priority information;
   an object directory for storing the object information; and
   a service directory for storing the service information.

5. The intelligent management apparatus of claim 3, wherein the context information contains location information of users and objects which exist inside and outside the digital home and information for contexts which happen inside and outside the digital home,
   wherein the history information contains profile information of the users, and
   wherein the object information contains profile information of the objects.

6. The intelligent management apparatus of claim 3, wherein the context aware portion includes:
   an information interpreter for interpreting the sensing data and outputting the interpreted information;
   an information integrator for integrating the interpreted information and outputting the context aware information based on the integration result; and
   an information manager for generating the context information, the history information and the object information based on the context aware information, determining whether the at least two contexts conflict from the context information, and generating context priority information based on the context information when the at least two contexts conflict.

7. The intelligent management apparatus of claim 6, wherein the information manager calculates priority values respectively corresponding to the context information, compares the priority values, and generates the context priority information according to the comparison result.

8. The intelligent management apparatus of claim 7, wherein the information manager determines priorities that the context information occupy in a plurality of priority items based on reference priority information previously set therein or information stored in the information directory and adds up the priorities.

9. The intelligent management apparatus of claim 8, wherein the plurality of priority items include the user priority, an interest priority, and a demand priority, and the information manager determines the priority of the context information such that the priority of the context information is lower as the priority value is lower and generates the context priority information according to the determination result.

10. The intelligent management apparatus of claim 7, wherein the information manager generates the context priority information based on user selection information which represents priorities of the context information respectively corresponding to the at least two priority values and the priority values.

11. The intelligent management apparatus of claim 3, wherein the service determining portion includes:
   an event handle for detecting happened events based on the context aware information and outputting event signals;
   an intelligent agent for requesting and receiving the context information, the history information, the object information, the context priority information, the service information, and the user priority information in response to the event signals, reasoning services corresponding to the events based on the received information, and outputting the reasoned service information; and
   a directory access controller for reading the context information, the history information, the object information, the context priority information, the service information, and the user priority information by request of the intelligent agent and outputting the above described information to the intelligent agent.

12. The intelligent management apparatus of claim 11, wherein the service control portion includes:
   a service manager for determining devices to be driven based on the reasoned service information and device identification information and generating a device selecting signal based on the determination result and the reasoned service information;
   a device identifying portion for outputting the device identification information which represents specification of available devices among service performing devices which exist inside and outside the digital home; and
   a device driving control portion for controlling drive of a corresponding device in response to the device selecting signal.

13. The intelligent management apparatus of claim 12, wherein when the devices to be driven do not exist the service manager outputs a first user intervention request signal to an external portion, receives first user selection information which represents specification of substitution devices of the devices to be driven from the external portion, determines whether at least two services conflict with each other based on the reasoned service information, the device identification information or the first user selection information, determines a service priority for the at least two services when the at least two services conflict with each other, and generates the device selecting signal according to the determined service priority.

14. The intelligent management apparatus of claim 13, wherein the service manager calculates priority values respectively corresponding to the at least two services, compares the priority values, and determines the service priority for the at least two services according to the comparison result.

15. The intelligent management apparatus of claim 14, wherein in order to calculate the priority values the service manager determines priorities that the at least two services occupy in a plurality priority items respectively based on reference priority information previously set therein and adds up the priorities.

16. The intelligent management apparatus of claim 15, wherein the plurality of priority items contains the user priority, an importance priority, and an available device priority, and the service manager determines the service priority such that a priority of the at least two services is lower as the priority values are lower.

17. The intelligent management apparatus of claim 15, wherein when the at least two priority values are the same, the service manager outputs a second user intervention request signal to an external portion and determines the service priority based on second user selection information which represents a priority of services respectively corresponding to the at least two priority values.

18. The intelligent management apparatus of claim 13, wherein the service manager generates study information based on the service priority, and the intelligent agent is studied by one of the study information and the context priority and updates information stored in the information directory through the directory access controller based on the study information.

19. An intelligent management method of a digital home network system, comprising:
    extracting context aware information from sensing data for inside and outside environment of a digital home;
    generating context information, history information, and object information based on the context aware information;
    aware contexts happened in the digital home based on the context aware information and generating context priority information which represents a priority of at least two contexts when the at least two contexts conflict;
    detecting events based on the context aware information and reasoning services corresponding to the happened events based on the context information, the history information, the object information, the context priority information, user priority information, and service information;
    determining service devices to be driven based on the reasoned services and determining a service priority of at least two services when the at least two services conflict;
    generating a user intervention request signal to adjust at least two service priorities of services when the at least two service priorities are the same; and
    controlling drive of the service according to the determined service priority.

20. The method of claim 19, wherein the step of generating the context priority information includes
    calculating priority values respectively corresponding to the at least two contexts; and
    comparing the priority values and determining a priority of the at least two contexts according to the comparison result.

21. The method of claim 20, further comprising, storing the context information, the history information, the object information, the context priority information, the user priority information, and the service information, wherein the step of calculating includes determining priorities that the context information occupy in a plurality of priority items respectively based on previously set reference priority information or the stored information; and adding up the determined priorities and outputting the added-up result as a priority value of the context information corresponding to the added-up result.

22. The method of claim 20, wherein the step of determining the priority includes, when the at least two priority values are the same, requesting user's intervention, receiving user selection information which represents a priority of context information respectively corresponding to the at least two priority values, and determining the priority of the at least two contexts based on the user selection information and the priority values.

23. The method of claim 19, wherein the step of determining the service priority includes
    calculating priority values respectively corresponding to the at least two services which conflict each other; and
    comparing the priority values and determining the priority of the at least two services according to the comparison result.

24. The method of claim 23, wherein the step of calculating includes
    determining priorities that the at least two service occupy in a plurality of priority items respectively based on previously set reference priority information; and
    adding up the determined priorities and outputting the added-up result as a priority value of a corresponding service.

25. The method of claim 23, wherein the step of determining the priority includes, when the at least two priority values are the same, requesting users intervention, receiving user selection information which represents a priority of context information respectively corresponding to the at least two priority values, and determining a priority of the at least two contexts based on the user selection information and the priority values.

26. The method of claim 23, further comprising, requesting user's intervention and receiving user selection information which represents specification of substitution device of the devices to be driven when the devices to be driven do not exist.

* * * * *